C. F. HARKRADER & G. A. MANYAN.
PLOW.
APPLICATION FILED APR. 28, 1911.

1,123,280.

Patented Jan. 5, 1915.

WITNESSES:
Thos. W. Riley
M. Newcomb

INVENTORS
C. F. Harkrader
G. A. Manyan
BY
W. J. FitzGerald & Co.
Attorneys

UNITED STATES PATENT OFFICE.

CALVIN FLETCHER HARKRADER AND GEORGE ALFRED MANYAN, OF TANCRED, CALIFORNIA, ASSIGNORS OF ONE-THIRD TO MILLARD McKELLIPS, OF TANCRED, CALIFORNIA.

PLOW.

1,123,280.  Specification of Letters Patent.  Patented Jan. 5, 1915.

Application filed April 28, 1911. Serial No. 623,347.

*To all whom it may concern:*

Be it known that we, CALVIN FLETCHER HARKRADER and GEORGE ALFRED MANYAN, citizens of the United States, residing at Tancred, in the county of Yolo and State of California, have invented certain new and useful Improvements in Plows; and we do hereby declare the following to be a full, clear, and exact description of the invention, such as will enable others skilled in the art to which it appertains to make and use the same.

This invention relates to plows and more particularly to plows to be employed in working near the roots of fruit trees, shrubbery, and the like.

The object of the invention is to provide a plow connected to the beam in such a manner that the latter will be free to swing to either side to facilitate the working or cultivating of the ground adjacent the roots of plants.

Another object is to provide a plow movable relatively to the beam upon a vertical axis located approximately midway the point and rear end thereof, and means to connect the front and rear ends of the plow to the beam.

Figure 1:
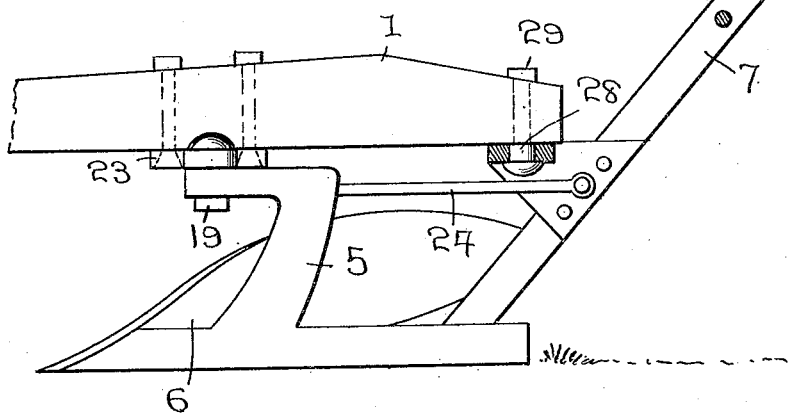
Figure 2:
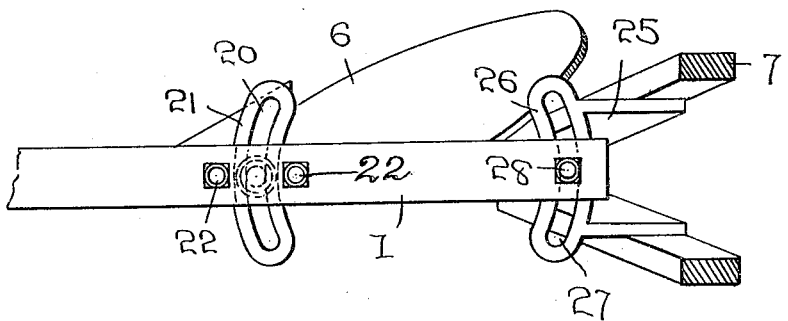

In the acompanying drawing which is made a part of this application, Figure 1 is a side elevation partly in section, of the plow, and, Fig. 2 is a top plan view thereof, partly in section.

Referring more particularly to the drawing, numeral 21 indicates a bracket secured to the under side of the beam 1 by means of bolts 22 extending through the ears 23 of the bracket and the beam. An arcuate slot 20 is formed in the bracket 21 through which is mounted a bolt 19 connected with the angular arm 5 of the plow 6, for supporting and guiding the forward end of the latter. A pair of handles 7 are secured to the rear end of the plow 6 and connected with the angular arm 5 by the rod 24. A bolt 28 is secured through the extreme rear end of the beam 1 by the nut 29, and is mounted through an arcuate slot 27 formed in a second bracket 26 secured to the handles 7 by the rearwardly directed ears 25. The slots 20 and 27 of the brackets 21 and 26 are so formed as to represent the opposite segments of a circle, the axis of which is located midway between the slots and disposed in a vertical plane. The bolts 19 and 28 are mounted for movement longitudinally within their respective slots, and it therefore follows that the plow 6 is adjustable angularly of the beam 1 upon the axis of the slots 20 and 27 which extends approximately through the center of the plow. It will thus be seen that the plow 6 is reliably connected at both its front and rear ends to the beam 1 at points equi-distant from the axis upon which it is movable. It will be further seen that the operator may guide the movement of the plow 6 by the handle 7, connected to said plow, and braced against the rear end of the beam 1 by the bracket 26 and the ears 25.

What we claims is:

A farming implement including a beam, a bracket secured to said beam having an arcuate slot therein; a plow, an angular arm carried forwardly of said plow, handles carried rearwardly of said plow, a second bracket secured to said handles having an arcuate slot therein but oppositely disposed to first said slot so that their continuations meet to form a circle, means carried on said arm slidable in first said arcuate slot and means carried by said beam slidable in second said slot so that said beam may be given a swinging movement about a vertical axis while dispensing with a pivot.

In testimony whereof we have signed our names to this specification in the presence of two subscribing witnesses.

CALVIN FLETCHER HARKRADER.
GEORGE ALFRED MANYAN.

Witnesses:
FRANK E. PIERCE,
J. H. NORTON.

Copies of this patent may be obtained for five cents each, by addressing the "Commissioner of Patents, Washington, D. C."